United States Patent Office 3,478,034
Patented Nov. 11, 1969

3,478,034
MANUFACTURE OF PYRIDINE
Alastair Campbell and Hugh Leithead Roberts, Runcorn, England, assignors to Imperial Chemical Industries Limited, Millbank, London, England, a corporation of Great Britain
No Drawing. Continuation of application Ser. No. 485,067, Sept. 3, 1965. This application Dec. 2, 1968, Ser. No. 781,706
Claims priority, application Great Britain, Sept. 10, 1964, 37,116/64
Int. Cl. C07d *31/10, 31/08*
U.S. Cl. 260—290                                    11 Claims

---

ABSTRACT OF THE DISCLOSURE

There is provided a process for preparing pyridine wherein substituted or unsubstituted glutaraldehydes or precursors thereof are reacted in the liquid phase with ammonium ions in the presence of molecular oxygen and metal ions selected from cupric and ferric ions and preferably further in the presence of palladium and/or platinum. The metal ions may be in a concentration of from 0.001 to 1.0 molar and the reaction temperature is up to 150° C. with a partial pressure of oxygen of at least 0.5 atmospheres.

---

This application is a continuation of Ser. No. 485,067, filed Sept. 3, 1965, and now abandoned.

This invention relates to the manufacture of organic bases and in particular to a process for the manufacture of pyridine or substituted pyridines.

In British specification No. 726,378 there is described a process for the preparation of pyridine or substituted pyridines which comprises interacting a glutaraldehyde with an aqueous solution of an ammonium salt in the presence of a ferric salt or a cupric salt as oxidising agent. In the said known process relatively high concentrations of the ferric salt or cupric salt were used. Thus in one example 1100 parts by weight of crystallised ferric sulphate were used per 200 parts by weight of glutaraldehyde. The use of such larrge proportions of iron or copper salts leads to difficulties both in the recovery of pyridine from the reaction products and in the treatment of the residues from the reaction. It is usual to make the reaction mixture alkaline prior to isolation of the pyridine by distillation; when large proportons of metal salts are present interactable residues are produced when the reaction mixture is made alkaline. Not only is it difficult to distil pyridine from such residues but it is difficult to recover the metallic component in a useful form. Furthermore, the known process cannot be operated continuously and the maximum amount of pyridine produced cannot exceed the stoichiometric equivalent of the ferric or cupric salt employed.

In its broadest aspect, the present process constitutes an improvement over the above-mentioned prior procedures for preparing pyridine, the improvement consisting in carrying out the reacton of glutaraldehyde, a substituted glutaraldehyde or a precursor thereof in the liquid phase with an ammonium salt or ammonia in the presence of molecular oxygen.

By the term "precursor" is denoted a compound which, in the absence of ammonium ions, will give rise to glutaraldehyde or a substituted glutaraldehyde when subjected to the conditions of temperature and pH contemplated for use in the reaction. Such precursors may be, for example, the cyclic enol-acetals of the said aldehydes. The cyclic enol-acetals are alternatively described as ethers of 2-hydroxy-3,4-dihydro-2H-pyrans. In particular, the alkyl ethers (2-alkoxy-3,4-dihydro-2H-pyrans) may be used, for example the alkyl ethers containing up to 6 carbon atoms in the alkoxy group.

It is preferred to carry out the reaction under conditions such that the ammonia is present predominantly as an ammonium salt rather than as free ammonia; the pH range from 1 to 7 is especially preferred.

Ammonium ions maybe introduced as such or may be generated in situ. It is preferred to introduce ammonium ions in the form of an ammonium salt; suitable ammonium salts include the salts of aliphatic carboxylic acids, for example ammonium acetate, and the salts of mineral acids, for example ammonium sulphate and ammonium nitrate. Alternatively, gaseous ammonia or a solution of ammonia may be introduced into the reaction mixture. Amides hydrolysable to form ammonium ions, for example formamide or urea, may also be employed.

It is preferred to use at least one mole of ammonium ion or ammonia for each mole of glutaraldehyde, substituted glutaraldehyde or precursor thereof. The concentration of ammonium ions is preferably at least 0.01 molar, for example in the range 0.01 to 2.0 molar.

The reaction medium may comprise water and/or an organic solvent; mixtures of water with one or more organic components are especially suitable.

The reaction may be carried out over a wide range of temperature and pressure, depending partly upon the particular reactants and reaction medium. In general, it is preferred to use temperatures in the range from 15° C. to 150° C., for example from 50° C. to 150° C.; especially preferred temperatures are those in the range from 80° C. to 130° C.

Preferably, the reaction is carried out at a pressure in the range from 1 to 30 atmospheres, for example in the range from 1 to 20 atmospheres; higher pressures, for example up to 50 atmospheres, may also be employed.

The partial pressure of oxygen is preferably in the range from 0.1 to 20 atmospheres; it is especially preferred to use an oxygen partial pressure of at least 0.5 atmosphere, for example about 1 atmosphere. The oxygen may be introduced as substantially pure oxygen or in the form of a mixture, for example a mixture of oxygen and nitrogen.

It is very advantageous to carry out the reaction not only in the presence of molecular oxygen but also in the presence of a salt of a metal of variable valency. Suitable metal salts include ferric salts and cupric salts. Double salts of ammonium and a metal of variable valency may also be used, for example ferric ammonium sulphate.

When the reaction between glutaraldehyde or a substituted glutaraldehyde (or a precursor thereof) and ammonium ions or ammonia is carried out in the liquid phase in the presence of molecular oxygen, as described herein, pyridine or substituted pyridines may be obtained using relatively low concentrations of the salt of a metal of variable valency.

The proportion of the salt of a metal of variable valency may suitably be between 0.01 and 0.2 mole of the salt per mole of glutaraldehyde, substituted glutaraldehyde or a precursor thereof but lower or higher proportions may also be used. The preferred concentrations of the metal salt are those in the range from 0.001 mole to 1.0 mol.

While it is essential that molecular oxygen be employed in the persent process (whether in the presence or in the absence of a salt of a metal of variable valency) the reaction system may contain additional catalytic components. When the system contains cupric or ferric ions, catalysts capable of promoting the regeneration of cupric or ferric ions from cuprous or ferrous ions may also be present. The reaction may be carried out, for example, in the presence of molecular oxygen, cupric or ferric ions and a catalyst comprising palladium or platinum. Suitable catalysts contain platinum and/or palladium (as the metal or as the oxide) in finely divided and may be deposited upon a support material. Suitable support materials are, for example, those consisting essentially of silica, alumina or a mixture or combination thereof. The proportion of the platinum or palladium catalyst is suitably in the range from 0.01 to 0.1 mole per mole of cupric or ferric ion but higher or lower proportions may be used.

The pyridine or substituted pyridines produced may be isolated by known techniques, such as solvent extraction or distillation, after increasing the alkalinity of the reaction mixture if necessary.

The reaction may be carried out batch-wise but it is an advantage of the process described herein that it lends itself to continuous operation.

The process is applicable, in particular, to the manufacture of pyridine itself and of alkylpyridines, for example methylpyridines. It will be apparent, however, that the process is applicable to the manufacture of a wide range of substituted pyridines.

The invention is illustrated but not limited by the following examples.

EXAMPLE 1

A palladium catalyst was prepared as follows:

1.8 grams of palladium chloride were dissolved in 26 ml. of 2 N hydrochloric acid and the solution was mixed with 20 grams of silica gel, (surface area 275 m.²/gram, mean pore radius 50 A.). The product was dried in a stream of nitrogen at 50° C. for 16 hours and then reduced in a stream of hydrogen at 150° C. until the catalyst was free from chloride. The catalyst was ground to an average particle size of 1 micron before use.

25 grams of ferric ammonium sulphate,

and 16.5 grams of ammonium sulphate were mixed with 500 grams of water and 1 gram of the palladium catalyst was added. The mixture was placed in a silver-lined autoclave which was then charged with oxygen to a pressure of 200 p.s.i.g., the pressure being maintained throughout the subsequent reaction during which the mixture in the autoclave was stirred. The temperature of the mixture was raised to 100° C. and a solution of 62.5 grams of glutaraldehyde in 250 ml. water was pumped into the autoclave over a period of 3 hours.

After cooling, the reaction mixture was made alkaline with aqueous potassium hydroxide solution and the mixture was steam-distilled. The molar yield of pyridine from glutaraldehyde was 20%.

EXAMPLE 2

The procedure of Example 1 was repeated except that the palladium catalyst was replaced by 0.25 grams of an unsupported catalyst consisting of equal parts by weight of platinum metal and palladium oxide.

The molar yield of pyridine from glutaraldehyde was 26%.

We claim:

1. In a process for the preparation of pyridine or substituted pyridine by reacting a compound selected from the group consisting of glutaraldehyde, alkyl glutaraldehydes and 2-alkoxy-3,4-dihydro-2H pyrans having up to 6 carbon atoms in the alkoxy group in the liquid phase with ammonium ions, the improvement which comprises carrying out said reaction in a medium which consist essentially of molecular oxygen and a metal ion selected from the group consisting of cupric and ferric ions.

2. The process of claim 1 wherein at least one mole of ammonium ions is used per mole of the said glutaraldehyde, alkyl glutaraldehyde and pyrans.

3. The process of claim 1 wherein said reaction is carried out in the presence of a catalyst consisting essentially of a noble metal selected from the group consisting of palalladium and platinum and the oxides of said noble metal.

4. The process of claim 1 wherein the concentration of ammonium ions is in the range 0.01 to 2.0 molar.

5. The process of claim 1 wherein the concentration of the metal ions is in the range 0.001 molar to 1.0 molar.

6. The process of claim 1 wherein the reaction is carried out at a temperature in the range 15° C. to 150° C.

7. The process of claim 1 wherein the reaction is carried out at a pressure in the range of 1 to 50 atmospheres.

8. The process of claim 1 wherein the reaction is carried out at a temperature in the range 80° C. to 130° C. and a pressure in the range 1 to 20 atmospheres.

9. The process of claim 1 wherein the partial pressure of oxygen is at least 0.5 atmosphere.

10. The process of claim 3 wherein the proportion of noble metal catalyst is in the range 0.01 to 0.1 mole per mole of metal ion.

11. The process of claim 1 wherein said reaction is carried out between glutaraldehyde and ammonium ions at a temperature in the range 80° C. to 130° C., and a pressure in the range of 1 to 20 atmospheres and in the presence of ferric ions and palladium metal or an oxide thereof.

References Cited

UNITED STATES PATENTS 3,306,905    2/1967    Hall et al. _____ 260—290

HENRY R. JILES, Primary Examiner

C. M. SHURKO, Assistant Examiner

U.S. Cl. X.R.

260—345.9